(12) United States Patent
Battle

(10) Patent No.: X1690
(45) Date of Patent: Mar. 27, 1812

(54) STEAMBOAT,PROPELLING BY POLES

(76) Inventor: Mellen Battle

Mellen Battle
Letters Patent (Patented November 6. 1829.)

The Schedule refered to in these Letters Patent, & making
part of the same, Containing a description, in the words of the said Mellen
Battle himself, of his improvement in Steam engines.

To all persons to whom these presents shall come, Mellen Battle of the City
of Albany, in the County of Albany and State of New York, mechanist sends greet=
=ing. Be it known, that I, the said Mellen Battle have invented a new and
useful improvement or method not known, nor used before in the making
or forming of Steam engines applicable to navigation, the propelling of Boats
or other vessels, or to purposes of manufacturing, or Mills of any description,
and called by me, and known by the name of "The reciprocating Steam engine"
The objects of this improvement are to lessen the quantity of fuel, to make the ge=
=nerator of steam more durable; less subject to explosion, more powerful, and with
2 a less quantity of water. First, this improvement consists of four distinct branches,
to be used in combination or otherwise, as is herein after more particularly explained,
and may be called 1st A new combination of the pipes, (herein after refered to) with
the common high or low pressure boiler or otherwise it may be called Reservoir. 2d
By placing a Reservoir between the high & low pressure Engines and connecting
them with one Shaft. 3d By the formation of a Generating supply pipe, and
4thly by the formation of a Generator in the Smoke pipe — Place any number of
tubes and pipes, as the power of the engine may require, in a vertical or horizontal position, and
in one or more ranges, either lengthwise or crosswise of the flue, connected at each
end by elbows, or otherwise forming one continued pipe, or they may be placed
in such a position as to admit the fire to pass about them. They should be sup=
=plied with water at one end of the Ranges either from the forced Pump, or
the Reservoir, or boiler. The reservoir or boiler may be placed above the tubes or
below, or on both sides, or wholly surround the tubes, but, it is preferable
in my opinion, to place them in such a position, that the tubes and boiler,
will form a flue of sufficient length to exhaust the heat, so that the boiler
or reservoir will receive its proportion of heat. The water that passes through these pipes, which is not generated into Steam, passes into the reservoir
with the Steam, and as a greater quantity of water will gather there, than is evapo=
=rated into steam, a pipe should be placed upon the lower part of the boiler
or reservoir, connected with the pipes, so that the gravity of the Water, will force
that overplus into the pipes again. a cock should be placed in the pipe to regulate
the quantity of water that is necessary to feed the pipes, and for this purpose it
is necessary, that the steam pipe, which passes from the pipes to the boiler or reser=
=voir, should enter the boiler above the surface of the water therein. In case
the gravity of the water is not sufficient to return the water into the pipes
again, a force-pump may be attached for that purpose. When this combination
is used for burning the anthracite coal, the flue will be made shorter, and the
furnace deeper than they are for wood as represented in figure D [17] and
figure H [40] in the accompanying draft. Secondly, when much of the heat
a number of [illegible] may be placed [illegible] the flue, inside the [illegible] pipe,
passes off, through the chimney, or smoke pipe, in such form as to have the heat
pass around them, so that the Steam passing through them from the boiler or reser=
=voir to the engine will receive additional elastic force. These pipes may be
made of cast or wrought iron or copper and form one continued pipe; or all
come together; and may be applied to other boilers distinct from the before
described. Thirdly a generating or heated supply pipe may be applied to the
high or low pressure Engine and boilers. This pipe passes from the forced pump
into the condenser, and is there coiled up in the form of a Still Worm, or may be
made with joints or elbows in such form as to coil a considerable length in the con=
=denser; or they may be cast into such a form as to make one connected pipe so that the
supply water passing through these pipes with the steam blowing direct from the
engine, will give the water a high degree of heat before it passes into the boiler or generator
When this is applied to the low pressure engine, it should be placed above the water in
the Condenser. When applied to the high pressure engine, it may be placed at the bottom
of the Condenser; and a copper pipe added to the bottom of the condenser immersed
in water with a valve in the out end, and which will cause a powerful va=
=cuum. Fourthly. The important object in the reciprocating Steam Engine is
attained by constructing and using an Engine with two working cylinders, one high
and the other low pressure, or they may be considered as two distinct engines, although they cannot have, the desired effect, unless they are connected and one uses the steam from the
other. and assists the other across what is termed the dead point, and the low pressure receives the steam
from the high. but instead of receiving it direct as the Wolf Engine does. it passes into a reservoir
of suitable size, to have the steam expand with suitable elasticity, to work the low pressure cylinder;
without reducing the elasticity of the steam between the intermediate strokes. There should also be
a safety valve on the reservoir, so that if the steam should rise to such a temperature, as to be too
high for the low pressure, the valve in that case, will permit the steam to escape. This reservoir
should be enclosed or surrounded with a non-conductor of heat. The two cylinders or engines, before
mentioned are to work on one connected shaft with cranks to stand at right angles. so that one en-
=gine takes the other across the dead point without the use of the fly wheel, or at most it will not
require more than half the weight of [illegible] fly, that a single engine does. These cylinders may be placed at
any convenient distance from each other, and may be worked by a walking beam or a cross head or
otherwise, and may be so coupled together that one may operate, and the other stand still, or one engine
may work one way, and the other the other way, as is frequently necessary in steam boats to turn short at
right angles. To perform this, a coupling should be placed between the engines, upon the crank shaft so
that the engines may be disengaged at pleasure. To work the high without the low pressure, the coupling should
be disengaged and the steam to pass from the generator or boiler to the high pressure engine and blow off at
the valve on the reservoir. To work the low without the high, the steam passes from the boiler to the reservoir,
without passing through the high pressure cylinder, and there expands to its proper elasticity to work the
low pressure engine. Explanation of the accompanying draft Figure A represents a front view of the com-
-bined generator showing 1.1.1. The reservoir or boiler 2. 2. 2. 2. The pipes 3 The doors of the furnace 4.
The steam pipe. Figure B represents the end view of the high pressure engine showing 5 The cylinder
6 the piston rod. 7 the walking beam 8 8 The reservoir. Figure C represents a front view of
the low pressure engine showing. 9. The cylinder. 10 the piston rod. 11 the walking beam 12. the
condenser. 13 The connecting or crank shaft 14. 14 the gallows frame Figure D represents a side view
of the combined generator, showing 15 the reservoir or boiler 16 the heated pipe. 17. the furnace 18
the horizontal tubes. 19 the steam pipe from the heated pipe to the reservoir 20. 20. [illegible] on the
bottom or lower part of the reservoir [illegible]. 21. The smoke pipe. Figure E represents the condenser
and heated supply pipe showing 22. 22. The condensers 23 The heated pipe Figure F represents a side
view of the double engine showing, 24 The walking beams. 25 the cylinder (low pressure) 26. The
valve. casing 27 The gallows .... frame 28 the air pump 29 the force pump. 30 the fly wheel.
31. cranks. Figure G represents a front view of the generating smoke pipe together with a boiler for low pressure or loco motive Engine. [illegible]ing 33 the generating smoke pipes. 33 The reservoir for steam and water 34.34. the heated pipes, and connecting pipe with reservoir 35 Door of furnace 36. Casing round the furnace Figure H represents a side view of boiler or generator for low pressure and loco-mo:tive Engine, Shewing. 37 reservoir for steam & water 38. heated pipe. 39 Connecting pipe with the reservoir. 40. furnace. Figure I represents an end view of the generating smoke pipe. In witness whereof I have hereunto subscribed my name the 13th day of October 1829

Millon Battle

Witnesses
J. C. Cole
Abm. Sickle

Ex'd. [illegible]